US006767033B2

(12) United States Patent
King, Jr. et al.

(10) Patent No.: US 6,767,033 B2
(45) Date of Patent: Jul. 27, 2004

(54) PIPE SADDLE

(76) Inventors: Lloyd Herbert King, Jr., 4 Deer Field Ridge Rd., Chesterfield, MO (US) 63005; Glenn M. Hoffman, 630 Top Notch La., Eureka, MO (US) 63025; Michael Belgeri, 1007 Bridgeport, Ellisville, MO (US) 63011

( * ) Notice: Subject to any disclaimer, the term of this patent is extended or adjusted under 35 U.S.C. 154(b) by 0 days.

(21) Appl. No.: 10/281,833

(22) Filed: Oct. 28, 2002

(65) Prior Publication Data

US 2004/0080158 A1 Apr. 29, 2004

(51) Int. Cl.[7] .............................................. F16L 41/00
(52) U.S. Cl. ...................................... 285/197; 285/921
(58) Field of Search ................................ 285/197, 198, 285/199, 23, 921; 137/318

(56) References Cited

U.S. PATENT DOCUMENTS

| | | | | |
|---|---|---|---|---|
| 3,523,668 A | * | 8/1970 | Logson | 285/197 |
| 4,112,944 A | * | 9/1978 | Williams | 137/318 |
| 4,140,155 A | * | 2/1979 | Tannery | 137/318 |
| 4,306,740 A | | 12/1981 | Kleykamp et al. | 285/39 |
| 4,316,622 A | * | 2/1982 | Nelson | 285/197 |
| 5,054,820 A | | 10/1991 | Lesquir et al. | 285/197 |
| 5,095,564 A | * | 3/1992 | Kruger | 285/197 |
| 5,105,844 A | * | 4/1992 | King, Sr. | 137/318 |
| 5,694,972 A | * | 12/1997 | King | 137/318 |
| 5,956,814 A | | 9/1999 | Choi | 24/16 |
| 5,970,738 A | * | 10/1999 | DeNolf et al. | 285/197 |
| 6,454,312 B1 | * | 9/2002 | Desorcy et al. | 285/197 |

FOREIGN PATENT DOCUMENTS

| | | | | |
|---|---|---|---|---|
| GB | 1372916 | | 11/1974 | F16B/2/08 |

* cited by examiner

*Primary Examiner*—David Bochna
(74) *Attorney, Agent, or Firm*—Jacobson & Johnson

(57) ABSTRACT

A pipe saddle having an elongated band with a radially outward extending hub on one end and a set of teeth extending along a latching member. The hub includes a finger engagement region and an internal tooth for engagement with one of the teeth in a set of teeth on the latching member. A finger engagement region on the latching member allows a user to use one hand to extend the latching member into the hub and to push the latching member into locking engagement in the hub by compressively squeezing on the two finger regions. In order to prevent withdrawal of the latching member from the hub a stop in the hub maintains the teeth in engagement with each other thereby maintaining the band in pressure engagement with a circumferential region of a pipe. Use of multiple teeth permits the pipe saddle to be used on different diameter pipes.

18 Claims, 4 Drawing Sheets

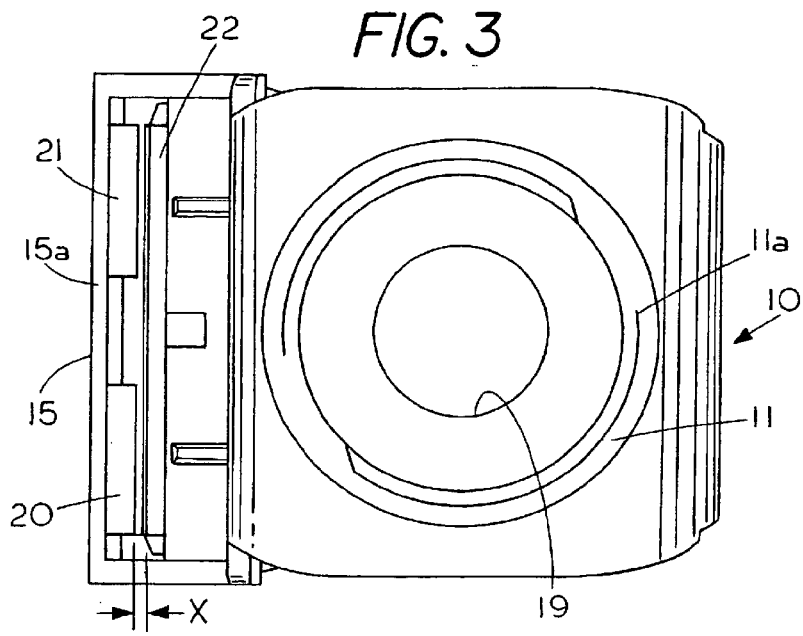
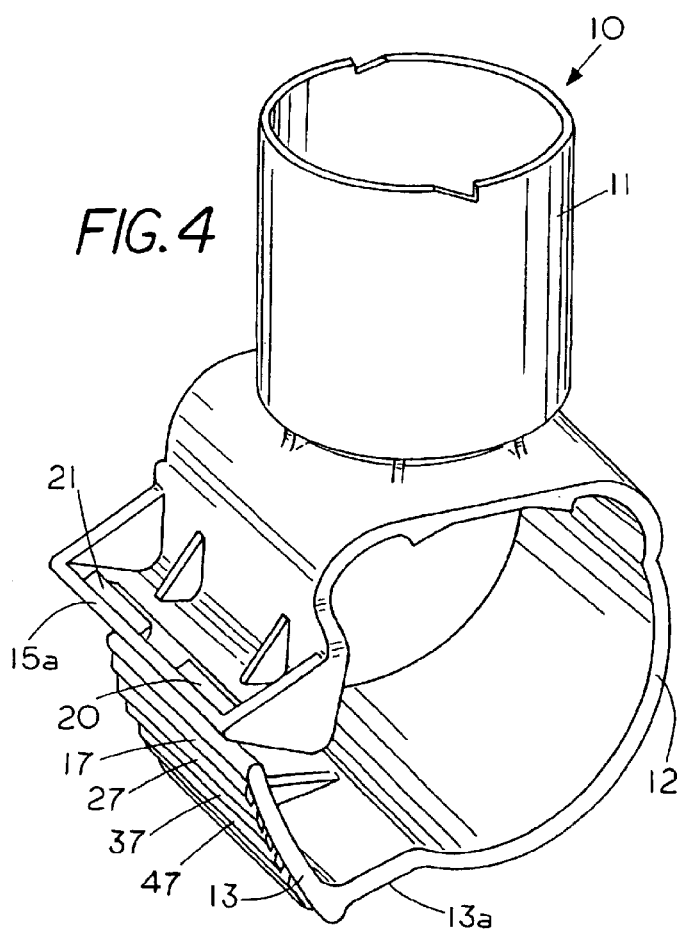

PIPE SADDLE

FIELD OF THE INVENTION

This invention relates generally to branch forming attachments and, more specifically, to a housing or pipe saddle which can be tightly secured to a variety of different size pipes.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of forming branch attachments to rigid and plastic tubing is known in the art. Generally, a pipe saddle is fastened around a pipe so that one can connect a branch tubing to a main tubing. Attaching a branch tubing to a main tubing often requires numerous steps and sometimes it is difficult to adequately seal the junction between the branch tubing and the main tubing.

The attaching device usually comprises two parts, a tap for forming the opening in the pipe and a saddle for holding the main tubing and the branch tubing in fluid communication.

U.S. Pat. No. 5,105,844 shows a tap or cutter having a through passage that both cuts a hole and forms a side attachment for the pipe. In the invention shown in U.S. Pat. No. 5,105,844 the pipe clamp or saddle comprises two identical parts that when snapped together around a plastic pipe form a threaded recess to allow a user to threadingly drive the coupon cutter through the plastic pipe and position a branch pipe in fluid communication with the main tubing.

The self tapping branch attachments are particularly well suited for underground irrigation systems that require in situ forming of branch lines to a main tubing, but they are also useful in other systems and other locations that use rigid, resilient or flexible tubing.

Other branching concepts use a piercing of the main pipe with a pointed tap. One example of such type of a tap is shown in U.S. Pat. No. 3,891,150 that shows an irrigation system that uses a probe with a tapered point that is forced though the sidewall of the main pipe. In this embodiment a strap engages a loop to hold the saddle in position on the pipe.

Another embodiment using a tapered point is shown in U.S. Pat. No. 5,694,972 which shows a saddle tee for an irrigation line and a stem with a tapered point that is punched through the plastic pipe. The pipe clamp used in the U.S. Pat. No. 5,694,972 is also shown in U.S. Pat. No. 4,291,855 and comprises two segments that are hinged at an intermediate point to allow the segments to spread apart and receive a pipe. A hook on each end of the segments engage each other to secure the device to a pipe.

Still another type of saddle tee is shown in U.S. Pat. No. 5,095,564 which has an arcuate body carrying a female fitting with a first clamp member laterally located on one side of the female fitting and a second clamp member laterally located on the opposite side of the female fitting. Since the clamps are laterally offset from the female fitting the holding force is also laterally offset from the circumferential region containing the hole in the pipe which could cause leakage problems around the junction between the saddle and the pipe.

While the above saddles with hooks and latches can be secured around a pipe it generally requires closely matching the diameter of the pipe with the diameter of the saddle in order to obtain a leakproof seal between the pipe and the saddle. Working against forming tight engagement around a pipe is the external hooking action required on saddles that use hooks. In order to use hooks to hold a saddle around a pipe it requires the hooks to perform two functions, one to engage the other hook and the second to maintain the two hooks in the engaged condition. In order to maintain the two hooks in an engaged condition each of the hooks are provided with sufficient depth so that the lips of the hooks cannot laterally slide past one another. As a result, this requires one to pull the ends of the hooks substantially past each other before they can be engaged. Once engaged the hooks are allowed to relax and engage each other. In effect, the strap must be substantially over tightened and then allowed to relax to the hooked condition. Consequently, it is sometimes difficult to tightly secure the saddle around the pipe and particularly if the saddle is to be used on pipes of different diameters since the saddle must be squeezed around the pipe and then allowed to relax to the hooked postion. Since the hooks generally require substantially over tightening before they arrive at a condition where the can be released to an engaged condition it can result in less than a tight clamp on a pipe.

The concept of cable ties is well known in the art. Generally, cable ties have a flexible strap that is wrapped around a bundle of wires with a head on one end that has teeth for forming locking engagement with a set of teeth located along the length of the flexible strap. The flexibility of the strap permits one to wrap the cable tie around any number of different size wires. Generally, the straps are narrow which allows the cable tie to flex and twist as they are squeezed around a bundle of wires or the like. While the flexibility of the strap permits engagement around different diameter loads and allows one to snug the cable tie tightly around the load, the flexibility of the strap lack limits the lateral support that might prevent twisting of the strap. Also the flexibility of the strap requires the strap to be pulled through a locking device in order to secure the cable tie around a bundle of wires.

In order to address the problem of tightly securing a branch attachment to a main pipe he present invention includes a pipe saddle with an elongated band that carries a branch extension and a set of teeth that can be linearly pushed into locking engagement in a hub by compressively squeezing on the hub and latching member to form tight circumferential securement of a pipe saddle around a pipe.

SUMMARY OF THE INVENTION

Briefly, the present invention comprises a pipe saddle having an elongated band with a radially outward extending hub on one end and a set of teeth extending along a latching member of the band. The hub includes an external finger engagement region and a tooth for engagement with a tooth on the latching member of the band. A finger engagement region on the latching member allows a user to use one hand to linearly push the latching member into latching engagement with the hub by squeezing on the two finger engagement regions. In order to prevent withdrawal of the latching member from the hub a stop in the hub maintains the teeth in engagement with each other to maintain the band in pressure engagement with a circumferential region of a pipe. By incorporating multiple teeth into the latching member the pipe saddle can be used with pipes of number of different diameter.

BRIEF DESCRIPTION OF THE DRAWINGS

FIG. 3 is a top view of the pipe saddle of FIG. 1 in an unlatched condition;

FIG. 4 is a perspective view of the pipe saddle of FIG. 1;

DESCRIPTION OF THE PREFERRED EMBODIMENT

Figure 1:
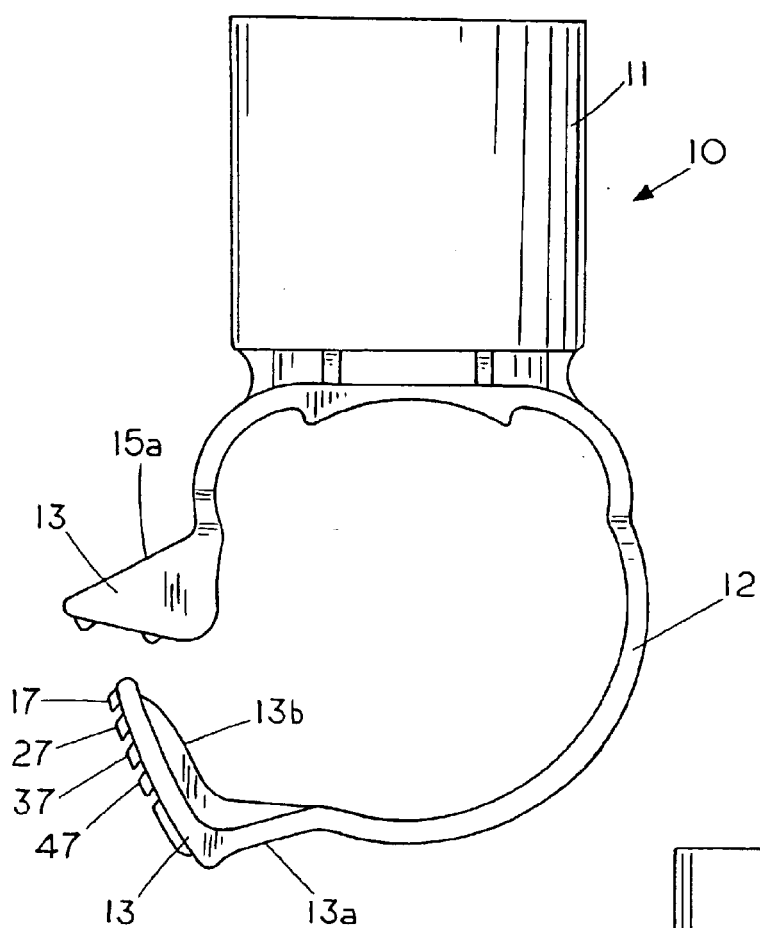
FIG. 1 is a side view of the pipe saddle in an unlatched condition.

FIG. 1 is a side view of a pipe saddle 10 having an extension 11 for holding a branch attachment member. Pipe saddle 10 is integrally formed to an elongated band 12 with band 12 having a radially outward extending hub 15 having a finger engagement region 15a on one end and a latching end or latching member 13 having a set of four teeth 17, 27, 37 and 47 thereon. Located on latching member 13 is a finger engagement region 13a. Finger engagement region 15a and 13a both extend radially outward from the band to allow a user to grasp the finger engagement regions between the users fingers in order to bring the latching member 13 into locking engagement with the hub 15.

In the preferred embodiment band 12 comprises a semi-rigid material which allows band 12 to flex sufficiently to be wrapped around a pipe as well as support a branch pipe in extension 11. In order to have a pipe saddle that holds two pipes in a sealed condition with respect to one another one can use rigid materials since the rigid materials will not flex when subject to external forces thus avoiding leaks; however, rigid materials are difficult to lockingly engage each other without a separate fastener. The present invention allows one to use a pipe saddle of semi-rigid materials to provide a leakproof seal around the junction of a main pipe and a branch pipe. Semi-rigid materials can best be understood in relation to rigid materials and flexible materials. The concept of rigid materials, which is well known, typically comprises materials that retain there shape when subject to an external force. Similarly the concept of flexible materials, which is also well known, typically comprise materials that bend or flex in response to an external force. The present invention involves a third category of materials namely, semi-rigid materials which are configuration dependent. That is, these materials have limited bending or flexing in response to external forces if in one configuration, however; these same materials will resist bending or flexing in response to external forces if arranged in a different configuration. It is this type of semi-rigid materials, typically polymer plastics, which are useful with the present invention since one portion of the semi-rigid materials can be configured into a cylindrical shape to provide a rigid coupling extension for securing an attachment thereto and another portion can be configured into an elongated strap or band with teeth that deflect or bend sufficiently to form engagement with each other. While the width of the band can vary the preferred embodiment the width of the band is at least five times the thickness of the band. In general, it is preferred that the width of the band be at least as wide as the extension so that pressure can be applied across the contact area between the peripheral of the pipe and the extension.

As shown in FIG. 1, band 12 is generally configured into a generally circular shape that fits around the peripheral portion of a pipe. Because the band 12 is not flexible it maintains a generally circular shape as shown in FIG. 1. On the other hand since the band 12 is not rigid it can flex allowing the band 12 to be placed around a pipe. The hub 15 with finger engagement region 15a extends radially outward as does the finger engagement region 13a on the latching member 13 of band 12.

Figure 2:
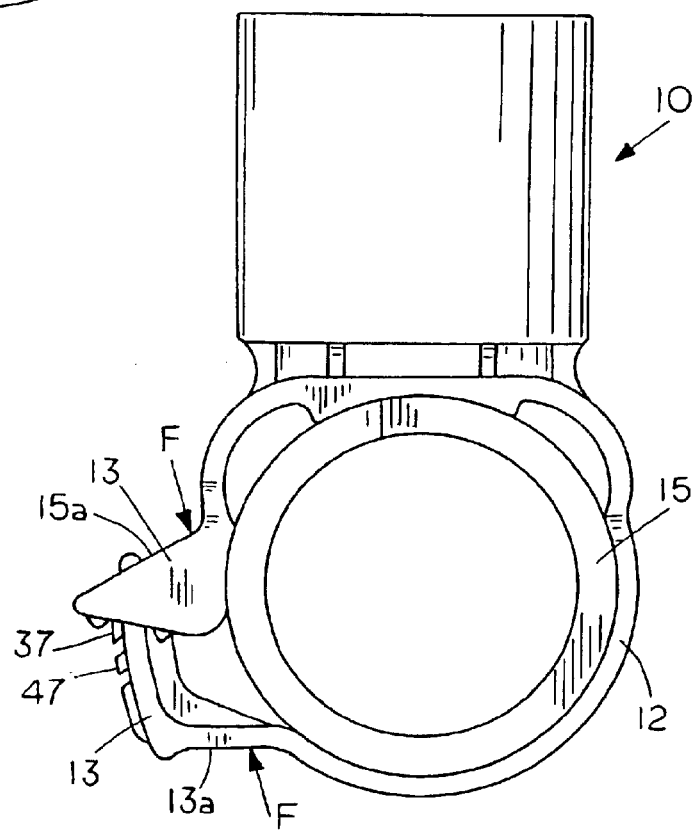
FIG. 2 is a side view of the pipe saddle of FIG. 1 in a latched condition around a pipe.

FIG. 2 shows the pipe saddle 10 secured around a pipe 15 with band 12 extending around pipe and with latching member 13 in a latched condition with hub 15 through engagement of a tooth on latching member 13. To illustrate the engagement action arrows designated by F indicate the direction of the finger squeezing forces that brings latching member 13 into engagement with hub 15. A feature of the present invention is that to engage the pipe saddle around a pipe only a single compressive action is required since the latching member and hub mechanically interact to form locking engagement through the linear extension of the latching member into the hub. In contrast, in order to hook a pipe saddle around a pipe one must extend the hooks past each other and then displaceable the hooks laterally to engage the hooks. With the present invention one merely pushes the latching member 13 into the hub to secure the pipe saddle to a pipe.

A reference to FIG. 3 shows a top view of the pipe saddle 10 showing extension 11 with internal threads 11a and an opening 19 where a branch pipe will extending through to form engagement with a main pipe located in the pipe saddle 10. FIG. 3 reveals two spaced apart teeth 20 and 21 which are carried on the outer portion of hub 15. Located on the inward side of hub 15 is a low friction lateral stop 22 which is spaced a distance x from the end of teeth 20 and 21. As shown in FIG. 3 the hub 15 which includes teeth 20 and 22 as well as stop 22 extends substantially the width of the pipe saddle. The width of band 15 assures that the radial compressive force applied to a pipe located in saddle 10 can be maintained in the lateral region where a branch pipe is secured to the main pipe. While the hub is shown with two side by side teeth one could also use one continuous tooth in hub 15.

Figure 5:
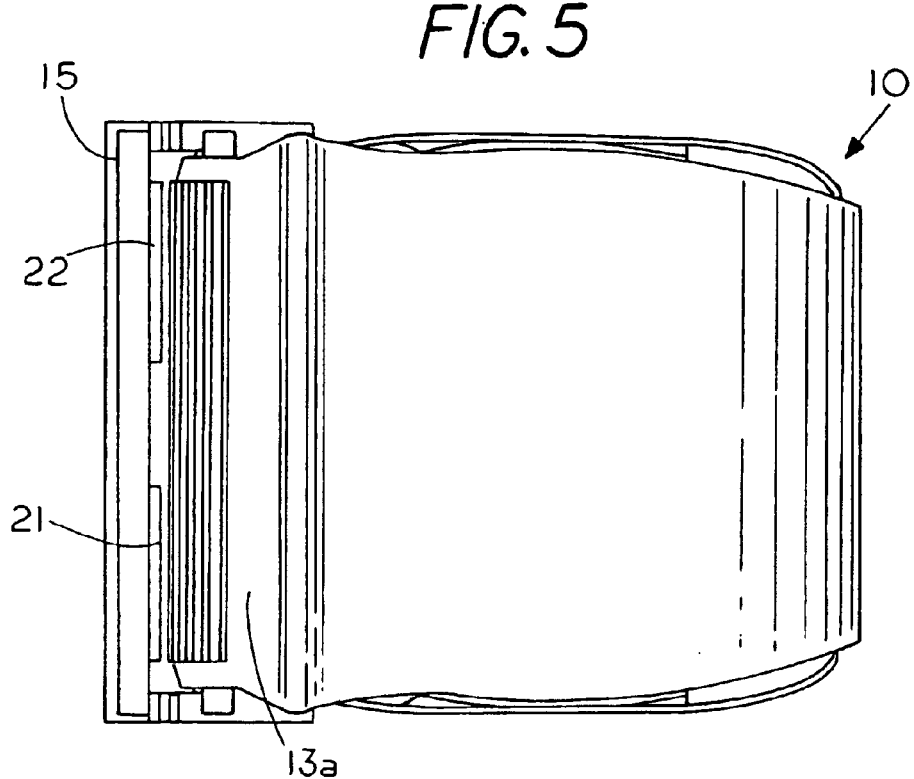
FIG. 5 is a bottom view of the pipe saddle of FIG. 1.

FIG. 4 proves a perspective view of pipe saddle 10 showing the latching member 13 in an unlatched condition with the teeth 17, 27, 37 and 47 proximate teeth 20 and 21 and FIG. 5 shows a bottom view of the pipe saddle in an unlatched condition.

Figure 6:
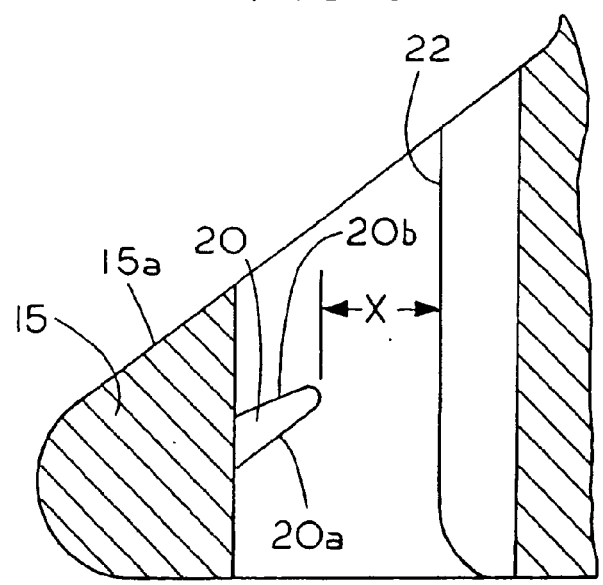
FIG. 6 is an enlarged view of a portion of the hub in an open condition.

FIG. 6 shows a sectional view of hub 15 revealing tooth 20 having a guide surface 20a and a latching surface 20b. The end of tooth 20 is spaced from the stop 22 a distance denoted by x. In the embodiment shown elongated tooth 20 forms the latching engagement with the teeth on the other end of the band 15. Stop 20 contains a smooth low friction surface to permit sliding of rib 13b of latching member 13 thereon.

Figure 7:
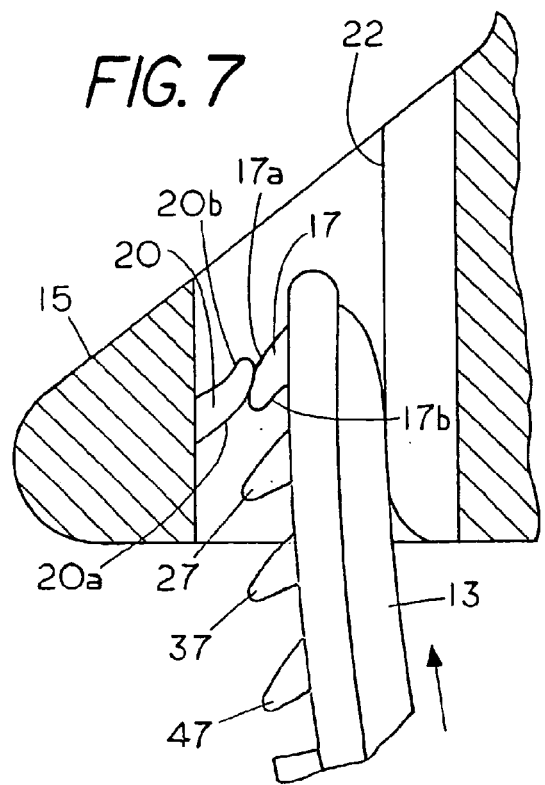
FIG. 7 is an enlarged view of the tooth of the hub and the tooth of the latching member in the process of deformable passing by each other.

FIG. 7 shows the sectional view of hub 15 with tooth 17 having a downwardly sloping top surface 17a sliding past an upward slope under surface 20a on tooth 20. That is, the tooth surfaces 20a and 17a are designed to slide past each other in one direction by flexing and deforming but once past each other there is sufficient resiliency in tooth 20 and tooth 17 that returns the teeth to there original shape. The tooth surfaces on the opposite sides extend outward to interlockinlgy engage each other and prevent the deformable sliding of tooth 17 and 20 past each other. While the inherent resiliency of the tooth 17 and 20 could cause the teeth to disengage as a withdrawal force increases the coaction of latching member 13 and stop 22 in hub 15 together with the interlocking tooth configuration prevent the disengagement of the teeth. Since the tooth 20 and tooth 17 are to be maintained in engagement with each other by the stop 22 the amount of over tightening is minimized since extra extension for hooking over a lip is eliminated. In addition, the teeth can made smaller thus providing a wider range of connecting positions to allow a tighter fit around the peripheral circumference of a pipe.

Figure 8:
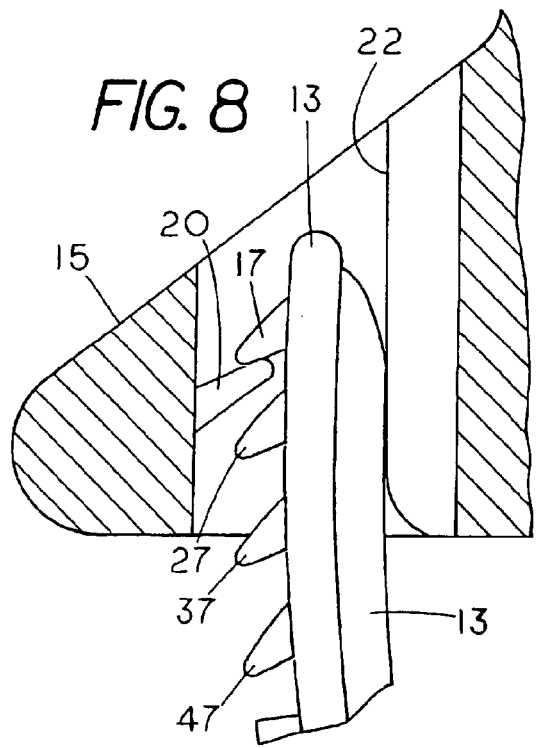
FIG. 8 is an enlarged view of the tooth of the hub and the tooth of the latching member in held in locking engagement with each other by a stop.

FIG. 8 reveals that once the tooth 17 passes tooth 20 the resiliency in the teeth allow the tooth 20 and tooth 17 to forming surface to surface engagement with each other. Tooth 17 and tooth 20 are held in surface to surface engagement with each other by stop 22 that supports a stiffing rib 13b located on the backside of latching member 13 to thereby prevent tooth 17 from sliding outward off the end of tooth 20. Thus the tooth located in the hub has an under side for pass-over engagement with the topside of the set of teeth on the latching member and a top side for forming holding engagement with an underside of any of the set of teeth on the latching member. While the hub has been shown with a single tooth and the latching member with a set of teeth it should be understood that the hub could also include a set of teeth that extend along the hub to accommodate different diameter pipes.

We claim:

1. A one-piece pipe saddle comprising:
    a semi-rigid elongated band, said elongated band having a latching member;
    an extension for securement of a branch line therein, said extension secured to said elongated band;
    a set of flexibly deformable teeth located on said latching member of said elongated band; and
    a hub located on said elongated band, said hub having a flexibly deformable tooth and a stop therein with said tooth and said stop defining an elongated opening in said hub with the elongated opening having a width narrower than a width of the latching member of said band, said tooth of said hub and said set of teeth on said latching member coacting by flexing and deforming to permit passage of at least one of said set of teeth into engagement with the tooth in said hub while said stop maintain said tooth in said hub in engagement with the at least one of said teeth in the latching member to thereby limit over tightening of the band.

2. The one-piece pipe saddle of claim 1 wherein said hub includes a finger engagement region and said latching member includes a finger engaging region to permit a user to bring the latching member into engagement with the hub by compressively squeezing on the finger engagement regions.

3. The one-piece pipe saddle of claim 1 wherein said semi-rigid elongated band has a width at least 5 times a thickness of the band.

4. The one-piece pipe saddle of claim 1 wherein the semi-rigid elongated band includes an opening therein and an the extension with includes threads for engaging a pipe therein.

5. The one-piece pipe saddle of claim 1 wherein the set of teeth includes at least four teeth.

6. The one-piece pipe saddle of claim 1 wherein the tooth located in said hub has an under side for pass-over engagement with said set of teeth and a top side for forming holding engagement with an underside of any of said set of teeth.

7. The one-piece pipe saddle of claim 1 wherein said hub includes at least two teeth located in a side-by-side condition with each other.

8. The one-piece pipe saddle of claim 1 wherein said latching member contains a stifling rib for slidingly engaging the stop in said hub.

9. The one-piece pipe saddle of claim 8 wherein linear displacement of the latching member with respect to the hub is sufficient to lock said latching member in said hub.

10. A pipe saddle comprising:
    an elongated band;
    a hub located on said band, said hub having a flexibly deformable tooth in said hub and a finger grasping region external to said hub;
    a latching member, said latching member having a flexibly deformable tooth extending there along and a finger grasping region so that when said latching member is extended into said hub a user can engage the tooth on the latching member with the tooth in said hub through compressive squeezing on the finger grasping region external to said hub and the finger grasping region on said latching member.

11. The pipe saddle of claim 10 including an extension for holding a branch attachment member.

12. The pipe saddle of claim 11 wherein the elongated band has a width of at least five times a thickness of the band.

13. The pipe saddle of claim 12 wherein the latching member includes at least four teeth.

14. (Presently amended) The pipe saddle of claim 11 wherein the latching member includes a stiffening rib.

15. The method of securing a pipe saddle to a main pipe comprising the steps:
    placing an elongated band having a hub on one end, a latching member on the other end and an extension intermediate the hub and the latching member around a peripheral portion of a main pipe;
    extending the latching member into the hub by squeezing on a finger grasping region on said hub and a finger grasping region on the latching member;
    bringing the pipe saddle into secure engagement by pushing the latching member into said hub; and
    deforming a tooth of said latching member or a tooth of said hub to permit passage of the tooth of said latching member past the tooth of said hub.

16. The method of claim 15 wherein a sole force in latching said latching member to said hub comprises applying compressive pressure to the finger grasping regions on said hub and said latching member to linearly extend the latching member into the hub.

17. The method of claim 15 including the step of integrally forming the extension to the elongated band.

18. The method of claim 15 including the step of latching the pipe saddle around a main pipe by releasing the compressive force on the finger grasping regions of said hub and said latching member after the tooth of the latching member has deformable passed the tooth of the hub.

* * * * *